No. 839,814. PATENTED JAN. 1, 1907.
B. CUNNINGHAM.
GRAIN AND EAR CORN ELEVATOR.
APPLICATION FILED MAR. 8, 1906.
2 SHEETS—SHEET 1.
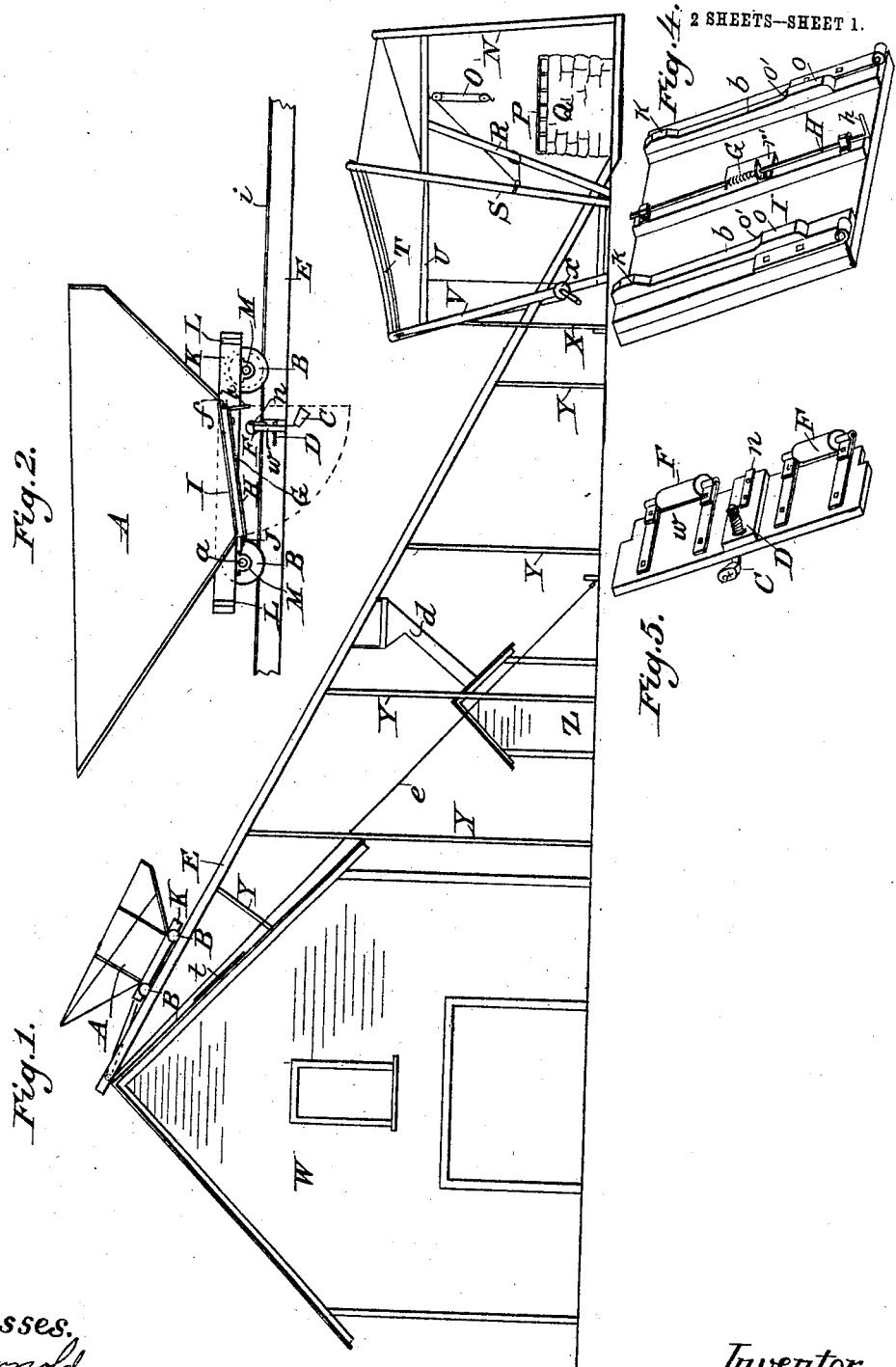
Witnesses.
J. W. Arnold
M. Pearl Malone
Inventor.
Bernard Cunningham

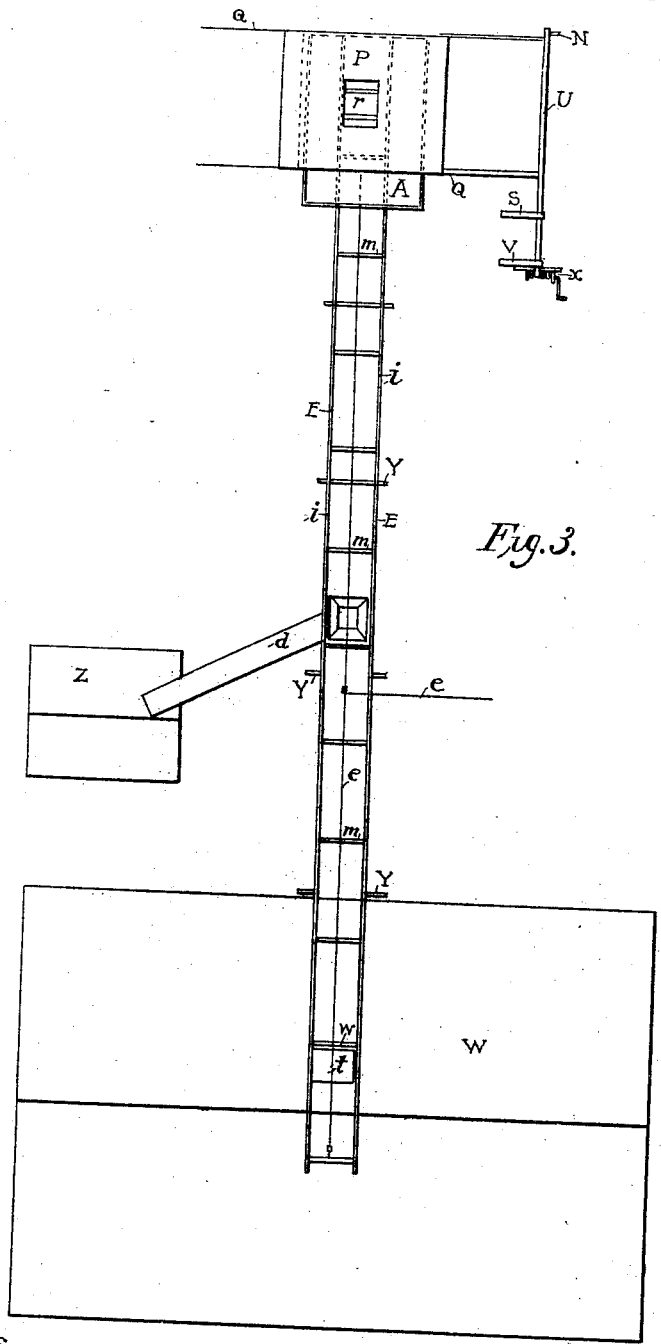

UNITED STATES PATENT OFFICE.

BERNARD CUNNINGHAM, OF SHANNON TOWNSHIP, POTTAWATOMIE COUNTY, KANSAS.

GRAIN AND EAR-CORN ELEVATOR.

No. 839,814. Specification of Letters Patent. Patented Jan. 1, 1907.

Application filed March 8, 1906. Serial No. 304,917.

*To all whom it may concern:*

Be it known that I, BERNARD CUNNINGHAM, a citizen of the United States, residing in Shannon township, in the county of Pottawatomie and State of Kansas, have invented a new and useful Grain and Ear-Corn Elevating Machine, of which the following is a specification.

My invention has special reference to apparatus used for transferring grain of all kinds from the wagon to the bin, such apparatus comprising a dump on which the wagon may be driven, a car into which the grain is dumped, an inclined track up which the car may be drawn, and the special appliances herein shown and described for automatically emptying the car at any point along the track and for automatically reclosing the car and returning it to the dump; and the invention consists of the parts, improvements, and combinations herein described and claimed.

In the drawings accompanying and forming part of this specification and in the description thereof I have shown my invention in its preferred form and have shown the best mode of applying the principles thereof; but it is to be understood that the invention itself is not confined to the particular mechanism herein set forth, that it may be applied to other uses, and that various changes may be made in form, proportions, material, transposition of parts, and the substitution of equivalent members without departing from the spirit of the invention.

In the drawings, Figure 1 is an elevation of the apparatus complete, some of the parts being shown somewhat graphically and embodying my invention. Fig. 2 is an enlarged vertical section of the car. Fig. 3 is a plan view of the apparatus complete. Fig. 4 is an enlarged detail bottom view of the trap-door removed from the car, and Fig. 5 is an enlarged detail view of the trip-board removed from the track.

Like letters of reference indicate like or corresponding parts throughout the several views.

A is a car of hopper-like construction mounted on trucks and wheels K L B (a is an axle, and M the bearing therefor) and running on the inclined track E E, which extends from the dumping-place hereinafter to be described to any other place to which it may be desired to elevate or transfer the grain, as to a door $t$ in the roof of a barn W. Z may represent a smaller or other grain-bin, to which the chute $d$ leads from the tracks. The car may be dumped either over the chute $d$ or the door $t$ by placing the trip-board hereinafter described at either point. The rails or tracks are mounted on suitable uprights Y Y.

The dump proper may consist of a bridge and a derrick. The bridge P may be provided with a door $r$, through which the grain is passed into the car and rests on suitable abutments Q, here shown as of masonry, but which may obviously be of any other suitable construction. At one end of the platform is a derrick comprising uprights N R V, a brace X, a power-lever S, a windlass $x$, a rope T, extending between the windlass and the power-lever, and a block and tackle O, operated by the power-lever. This tackle is fastened to the front end of the wagon or wagon-box, and by operating the windlass the front end is raised, so as to dump the grain out of the wagon through the door $r$ into the car A. The weight of the wagon will return itself to the platform when the crank is released.

The bottom of the car consists of the trap-door I, (see enlarged bottom view in Fig. 4,) hinged at its rear end to the car, and secured to the under side of the door is the latch H, which engages a catch J, secured to the forward end of the bottom of the car. A spring G tends to push the latch into engagement with the catch in a usual and simple manner. The rearward end of the latch is turned downwardly at $h$ for a purpose presently explained.

Secured between the rails at any point where it is desired to empty the car is a trip-board $w$, (see enlarged view, Fig. 5,) provided with rollers F F, a compression bumping-spring D, a bell suspended on a spring-rod, as shown at C, and a rod extending through the spring and trip-board for holding the spring in place and for ringing the bell when the trap-door falls against the spring. A tripping-pin $n$ projects upwardly from the trip-board and into the path of the rear end $h$ of the latch, so that when the car is drawn over the trip-board the engagement of the latch end $h$ with the tripping-pin $n$ will cause the latch to be withdrawn from the catch, and thus permit the trap-door to fall open on its hinges and dump the grain. When the trap-door thus falls, it strikes with the bumping-block $r'$ against the spring-bumper D, which takes up the concussion and prevents any hard jarring of the framework or other parts, and by the rod which extends through the spring and trip-board the bell is rung as a warning to the operator to stop. As the trap-door falls so as to be suspended against the upper side of the trip-board, it is plain that while the grain is running out the door will prevent the car from running back down the track, even though otherwise free to do so. Fastened to the under side of the trap-door are a pair of timbers $b\ b$, which encounter the rollers F F, respectively, as the car passes over the trip-board. Each timber has a slighty-raised flat portion $o$, which rests against its roller F when the trap-door is down, a slight incline $o'$, and another raised portion $k$ at the opening end. The purpose of the inclines $o'\ o'$ is to give the car a little more freedom in starting on its return when it first begins to move back down the track by the force of gravity, as will be hereinafter more fully explained. The purpose of the raised portions $k\ k$ is so that as the car passes back down over the rollers F F the trap-door will be pressed up high enough so as to bring the spring-latch H into engagement with the catch J, and thereby automatically lock the trap-door. To elevate the car, I prefer to use simply a rope $e$ with suitable pulleys and drawn by the team which hauls the wagon. When the load has been emptied from the car and the rope is laid out on the ground with the double and swingle trees attached, the weight and friction are sufficient to hold the car in place; but by giving the rope a few feet of slack, as by throwing the swingle and double trees back a few feet, this will permit the car to slide back far enough until the inclined places $o'\ o'$ come into contact with the rollers, and thereupon the car will be quite considerably relieved by reason of the more inclined engagement with the rollers and will thus be given a good start on its downward journey, easily taking up the slack in the rope and dragging the swingle and double trees, which nevertheless act as a brake to prevent too swift a descent.

Arranged along the track at suitable intervals are the cross-beams $m\ m$, which may be held in place by tie-rods, and the trip-board may be placed anywhere along the track either in a place specially provided or by removing a cross-beam and securing the trip-board by its tie-rods.

What I claim is—

1. In apparatus of the kind set forth, the combination with an inclined track and a car and means for operating the car on the track, of a trap-door hinged at its rear to the bottom of the car, a spring-pressed latch, means located at the rearward end of the trap-door for operating the latch, a trip-board between the rails of the track extending into the path of the latch-operating means, a bumper-spring, and rollers for returning the trap-door as the car passes back downwardly over said trip-board.

2. In apparatus of the kind set forth, the combination with an inclined track and a car and means for pulling the car up the track, of a trap-door hinged at its rear end to the bottom of the car, a spring-pressed latch for locking the door closed, means located at the rearward end of the trap-door for operating the latch, a trip-board between the rails of the track provided with a tripping-pin in the path of the latch-operating means, door-closing rollers, and a spring-bumper, whereby said door will be adapted to fall against the upper side of the trip-board and the weight of the discharging grain against said trap-door will hold the car against backward movement down the incline.

3. In apparatus of the kind described, the combination with the inclined track and a car and a rope and pulleys for hauling the car up the track, of a trap-door hinged at its rear to the bottom of the car and having a spring-pressed latch at its forward end for locking the door closed, said latch having an outwardly-bent rear end located near the hinges, a trip-board between the rails of the track extended into the path of said outwardly-turned latch end, whereby the trap-door may be automatically released and whereby it will fall in front of the trip-board, and rollers whereby the backward travel of the car will automatically close the trap-door.

4. In apparatus of the kind set forth, the combination with the inclined track and a car and means for hauling the car up the track, of a trap-door for the bottom of the car hinged thereto at its rear, a spring-pressed latch at the front end of the trap-door with operating means at its rearward end, a trip-board between the rails of the track extending in the path of the latch-operating means, whereby the trap-door will be released and fall against the front side of said trip-board, a spring-bumper secured to the trip-board, a warning-bell operated thereby, inclines $o'$, $o'$, projections $k$, $k$, and rollers F, F, for starting the car and closing the door, as set forth.

5. In apparatus of the kind set forth, the combination with a track and a car and means for hauling the car up the track, a trap-door for the car-bottom hinged thereto at its rearward end, a spring-pressed latch at its forward end and operating means at its rearward end, a trip-board between the rails of the track having a tripping-pin extended into the path of the latch-operating means, whereby the trap-door will be released and rest against the front side of the trip-board, rollers secured to the trip-board for closing the trap-door, and inclines $o'$, $o'$ arranged on the bottom of the trap-door for permitting the car to gain initial headway on its return by the force of gravity.

BERNARD CUNNINGHAM.

Witnesses:
J. W. ARNOLD,
M. PEARL MALONE.